United States Patent [19]
Chiou

[11] Patent Number: 5,260,851
[45] Date of Patent: Nov. 9, 1993

[54] HOUSING FOR A COMPUTER POWER SUPPLY UNIT WITH HARD DISK DRIVE STORAGE CHAMBER THEREON

[76] Inventor: Ming D. Chiou, 3F., No. 4, Alley 11, Lane 327, Sec. 2, Chung Shan Rd., Chung Ho City, Taipei, Taiwan

[21] Appl. No.: 965,336

[22] Filed: Oct. 23, 1992

[51] Int. Cl.⁵ .......................... H05K 7/14; H05K 5/00
[52] U.S. Cl. ...................................... 361/685; 361/724
[58] Field of Search ............... 220/4.02; 361/384, 380, 361/390–395, 399, 427, 429; 174/52.1; 364/708

[56] References Cited

U.S. PATENT DOCUMENTS 2,887,242  5/1959  Grau ................................. 220/4.02
5,136,466  8/1992  Remise et al. ...................... 361/391

Primary Examiner—Leo P. Picard
Assistant Examiner—Michael W. Phillips
Attorney, Agent, or Firm—Pro-Techtor International

[57] ABSTRACT

A housing consisted of a cover covered on a case to hold a computer power supply unit, wherein a storage space is defined between an upright front panel and an upright back panel on the case above a flat top wall of the cover for mounting a hard disk drive by an angle bar and screws.

7 Claims, 3 Drawing Sheets

HOUSING FOR A COMPUTER POWER SUPPLY UNIT WITH HARD DISK DRIVE STORAGE CHAMBER THEREON

BACKGROUND OF THE INVENTION

The present invention relates to housings and relates more particularly to a housing for a computer power supply unit which has a storage chamber on the the top for holding a hard disk drive.

A variety of personal computers are known and widely used for different purposes. The mainframe of a personal computer commonly has a space for mounting a hard disk drive and a space for mounting a power supply unit. Because of the arrangement of these spaces, the size of a personal computer can not be greatly reduced.

SUMMARY OF THE INVENTION

The present invention is to fully utilize the internal space of a computer mainframe so that the total size of a computer mainframe can be greatly reduced. According to the preferred embodiment of the present invention, the housing for a power supply unit for a computer is comprised of a cover covered on a case. When assembled, a storage space is defined between an upright front panel and an upright back panel on the case above a flat top wall of the cover for mounting a hard disk drive by an angle bar and screws.

DETAILED DESCRIPTION OF THE PREFERRED EMBODIMENT

Figure 1:
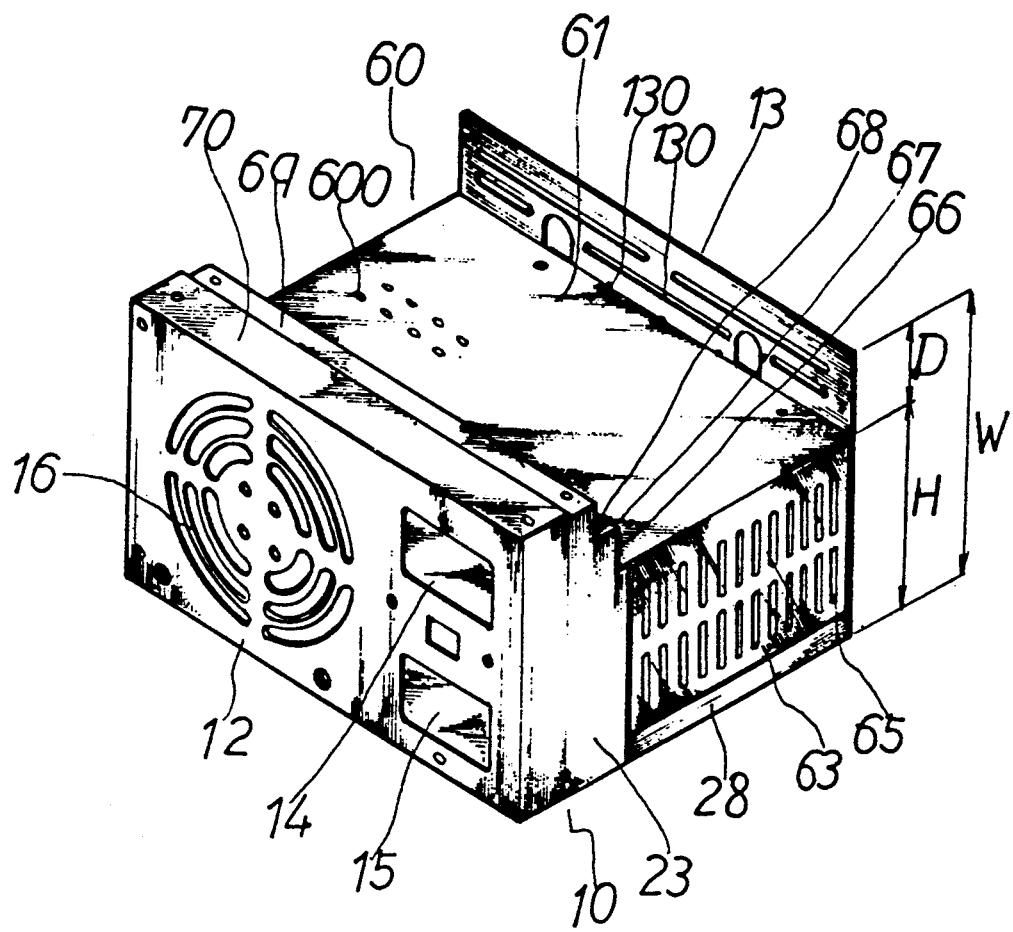
FIG. 1 is an elevational view of a housing for a computer power supply unit embodying the present invention.
Figure 2:
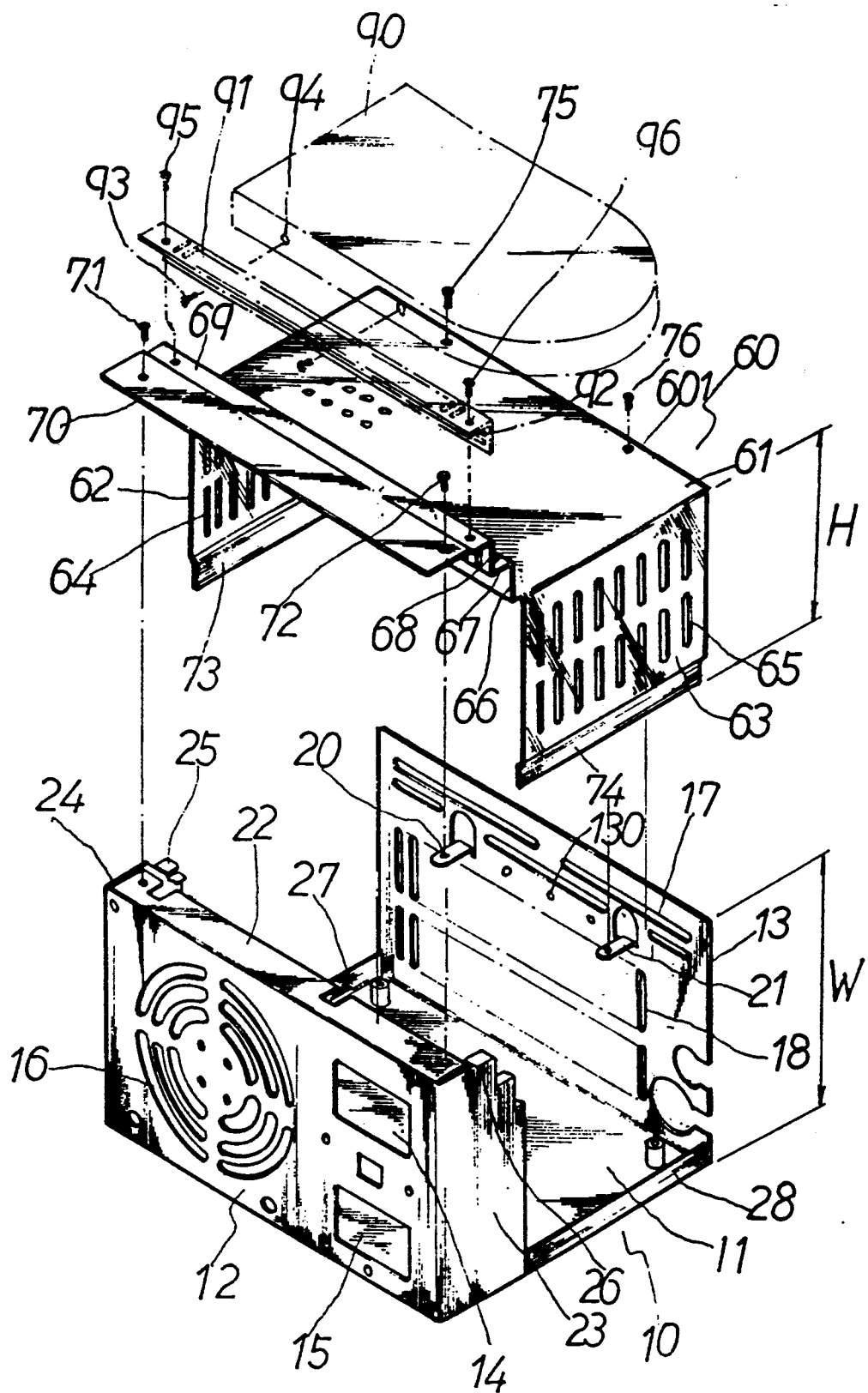
FIG. 2 is an exploded view thereof.

Referring to FIGS. 1 and 2, therein illustrated is a housing for a computer power supply unit embodying the present invention which is generally comprised of a case 10 and a cover 60.

The case 10 comprises a flat bottom panel 11, an upright font panel 12 upstanding from the flat bottom panel 11 along one side thereof, an upright back panel 13 upstanding from the flat bottom panel 11 along an opposite side thereof, and two vertical flanges 27,28 upstanding from the flat bottom panel 11 on the other two opposite sides thereof respectively connected between the front panel 12 and the back panel 13. The front panel 12 has holes 14,15 for fastening connectors, and a ventilation port 16 for letting out foul air. The top of the front panel 12 is bent inwards at right angle forming into a horizontal top flange 22. The two opposite sides of the front panel 12 are respectively and perpendicularly bent inwards forming into two upright side walls 23,24 respectively abutted to the vertical flanges 27,28, each of which has a stepped top edge 26 or 25 extended out of the horizontal top flange 22. The back panel 13 has a plurality of horizontal and vertical slots 17, 18 for dissipating heat, and two spaced lugs 20,21 on the inside made through the process of punching.

The cover 60 is made in an invertedly disposed U-shaped structure having two side walls 62,63 vertically extended downwards from two opposite shorter sides of a flat top wall 61 thereof, each of which has a plurality of slots 64 or 65 for dissipating heat and a bottom flange 73 or 74. The flat top wall 61 of the cover 60 has a plurality of perforations 600 through the body thereof for dissipating heat, a stepped mounting board 66,67,68,69 extended upwards from one side thereof between the two side walls 62,63 of the cover 60 and fitted over the stepped top edges 25,26 of the two side walls 24,25 of the front panel 12 of the case 10 and terminated into a horizontal cover plate 70 fastened to the horizontal top flange 22 of the front panel 12 by screws 71,72. While fastening the horizontal cover plate 70 to the horizontal top flange 22 of the front panel 12, the two bottom flanges 73,74 of the two side walls 62,63 of the cover 60 are respectively attached to the two vertical flanges 27,28 of the case 10 on the inside for permitting the top wall 61 of the cover 60 to be fastened to the lugs 20,21 on the back panel 13 of the case 10 by screws 75,76 with the back edge 601 of the top wall 61 stopped below a series of stub rods 130 on the back panel 13 of the case 10. Furthermore, the height H of the side walls 62,63 of the cover 60 is lower than the height W of the side walls 23,24 of the case 10, and therefore a difference of elevation D is formed between the case 10 and the cover 60 as the case 10 and the cover 60 are assembled into a housing for a computer power supply unit.

Referring to FIG. 2 again, a hard disk drive 90 may be fastened to the stepped mounting board 66,67,68,69 by an angle bar 91 and supported above the top wall 61 of the cover 60. The angle bar 91 has a longitudinal slot 92 through one leaf thereof, through which screws 93 are threaded into screw holes 94 on the the hard disk drive 90 to connect the angle bar 91 to the hard disk drive 90, and holes (not indicated) on the other leaf thereof, through which screws 95,96 are respectively threaded into screws holes (not indicated) on the step 69 of the stepped mounting board to connect the angle bar 91 to the stepped mounting board.

Figure 3:
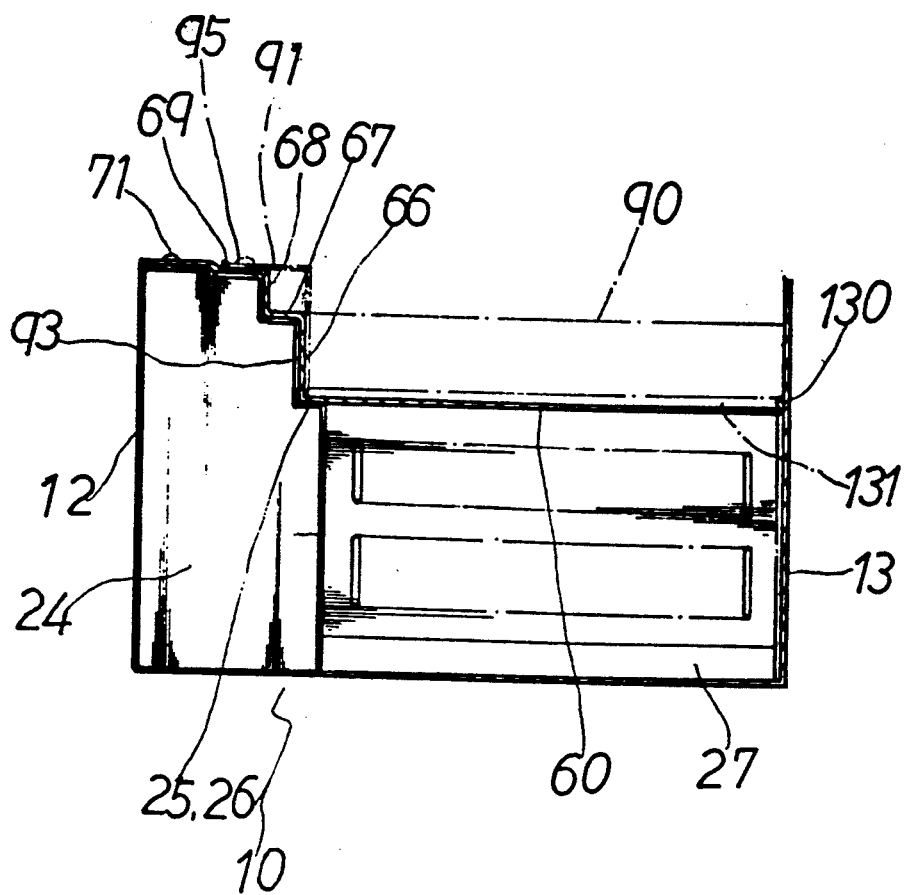
FIG. 3 is a sectional assembly view thereof.

Referring to FIG. 3, the hard disk drive 90 is set in the spaced formed of the difference of elevation between the case 10 and the cover 60 and spaced from the top wall 61 of the cover 60 by a space 131.

As indicated, the present invention provides a housing for a computer power supply unit having a cover covered on a case with a recessed space defined on the top for holding a hard disk drive.

What is claimed is:

1. A housing comprising a cover on a case holding a computer power supply unit, said case comprising a flat, rectangular bottom panel, an upright front panel and an upright back panel extending upward from said flat bottom panel along two opposite sides thereof, two vertical flanges extending upward from said flat bottom panel on the sides not occupied by said front and back panels, said flanges connecting said front panel to said back panel, said upright front panel having a top bent inward and formed into a horizontal top flange and said upright front panel having two sides bent inward and formed into two upright side walls abutting said vertical flanges, said cover further comprising two side walls vertically extending downward from two opposite shorter sides of a flat top wall thereof and respectively attached to said two vertical flanges on said flat, rectangular bottom panel of said case, said flat top wall of said cover having a stepped mounting board extending upward from one side thereof and fastened to said horizontal top flange on said upright front panel of said case, wherein a storage space is defined between said upright front panel and said upright back panel above said flat top wall of said cover, said storage space being of sufficient size to accommodate a hard disk drive.

2. The housing of claim 1 wherein an angle bar is included to secure a hard disk drive to the stepped mounting board of the top wall of said cover.

3. The housing of claim 1 wherein a series of stub rods on said back panel of said case above said top wall of said cover is included to secure a hard disk drive.

4. The housing of claim 1 wherein the upright back panel of said case has two spaced lugs made through the process of punching, to which the top wall of said cover is fastened.

5. The housing of claim 1 wherein the two side walls of said cover are respectively terminated into a bottom flange bent inwards and then downwards and respectively attached to either vertical flange of said case on an inner side.

6. The housing of claim 1 wherein said stepped mounting board of said flat top wall of said top cover fits over said two side walls of said upright front panel of said case, the side walls being provided with stepped top edges.

7. The housing of claim 1 wherein ventilation holes are respectively made on the upright front panel and the upright back panel of said case and the top wall and two side walls of said cover for dissipating heat.

* * * * *